UNITED STATES PATENT OFFICE.

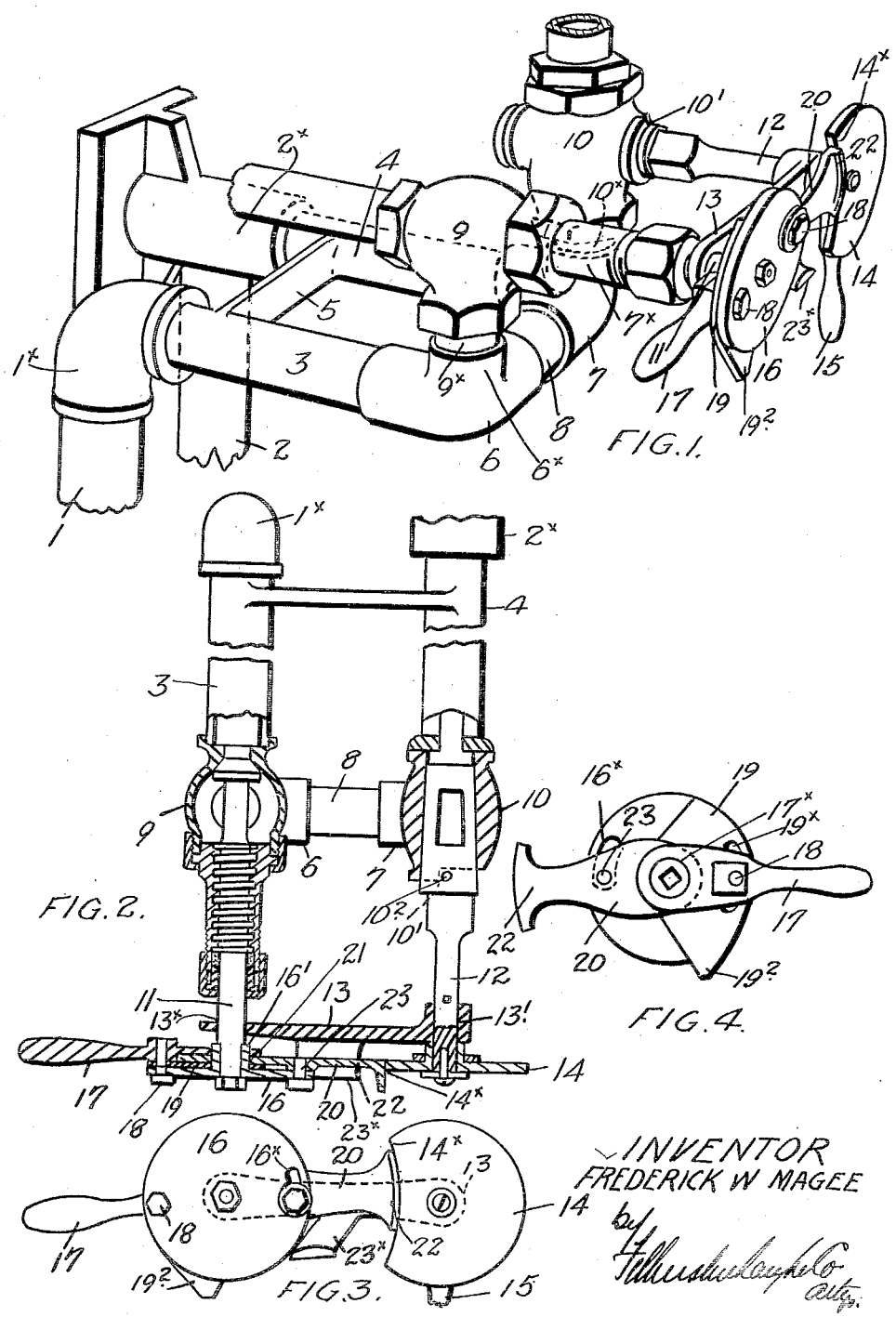

FREDERICK WILLIAM MAGEE, OF LONDON, ONTARIO, CANADA, ASSIGNOR OF ONE-HALF TO THOMAS WILLIAM BAKER, OF LONDON, ONTARIO, CANADA.

GAS AND WATER CONTROLLING DEVICE FOR WATER-HEATERS.

1,309,295.  Specification of Letters Patent.  Patented July 8, 1919.

Application filed March 30, 1918. Serial No. 225,795.

*To all whom it may concern:*

Be it known that I, FREDERICK WILLIAM MAGEE, of the city of London, in the county of Middlesex, in the Province of Ontario, Canada, have invented certain new and useful Improvements in Gas and Water Controlling Devices for Water-Heaters, of which the following is the specification.

My invention relates to improvements in gas and water controlling devices for water heaters and the object of the invention is to devise means for controlling the inlet gas and water valves whereby it is impossible to open the gas supply valve before opening the water supply valve and further to provide adjustable means whereby the maximum or minimum rate of flow of water supply is controlled and it consists essentially of the following arrangement and construction of parts as hereinafter more particularly explained.

Figure 1, is a perspective view of my controlling device.

Fig. 2, is a plan view mostly in section of the parts shown in Fig. 1.

Fig. 3, is an end view of my controlling means.

Fig. 4, is a reverse view of the adjustable levers for controlling the maximum and minimum flow of water through the water supply valve.

In the drawings like letters of reference indicate corresponding parts in the various figures.

1 indicates the water supply pipe and 2 the gas supply pipe. 3 indicates a horizontal extension to the pipe 1 connected to such pipe by an elbow $1^x$. 4 indicates a horizontal extension of the pipe 2 connected to such pipe by a bracket elbow $2^x$. The horizontal pipe portions 3 and 4 are connected together by a tie bar 5 at one end in proximity to the elbows $1^x$ and $2^x$. 6 indicates an elbow connected to the outer end of the pipe 3. 7 indicates an elbow connected to the upper end of the pipe 4.

8 indicates a rod portion, which is secured into the opposing arms of the elbows 6 and 7 and which thereby co-acts with the tie bar 5 to definitely space the pipe portions 3 and 4 apart and hold them in an absolutely parallel and stationary position.

9 indicates a water supply valve, which is connected by a nipple $9^x$ to the upwardly extending arm $6^x$ extending from the elbow 6. 10 indicates the casing of the gas supply valve which is connected by a nipple $10^x$ to the upwardly extending arm $7^x$ of the elbow 7. 11 indicates the operating stem of the valve contained in the casing 9. 12 indicates the operating stem of the valve contained in the casing 10.

It will be readily seen that the valve operated by the stem 12 is of a plug type and the valve operated by the stem 11 is of a screw type known as the "Penberthy" valve.

13 indicates a tie bar provided with orifices $13^x$ and $13'$ through which the stems 11 and 12 extend. By this means the stems 11 and 12 are positively held at a definite position apart.

The casing 10 is provided with a right angular cut-off portion $10'$ common to this type of valve with which a limiting pin $10^2$ carried by the body of the valve co-acts to limit the movement of the valve.

14 indicates a disk secured to the outer end of the stem 12 by suitable means. The disk 14 is provided with a cut-away portion $14^x$, which is arc-shaped, the arc being concentric with the center of the stem 11. 15 indicates an operating lever connected to the disk 14. 16 indicates a disk secured to the stem 11. The disk 16 is provided with an arc-shaped slot $16^x$. 17 indicates a lever provided with an orifice $17^x$ at its inner end, which fits around the hub $16'$ of the disk 16. 18 indicates a securing screw, which extends through the disk 16 and into the lever 17. 19 indicates a plate, which is provided with an arc-shaped slot $19^x$ and an orifice which also fits around the hub of the disk 16. The major portion of the plate fits the periphery of the disk 16 but its lower portion projects outwardly beyond such periphery at $19^2$ forming a stop.

The screw 18 extends through the plate 16 and lever 17 and through the plate 19. By loosening the screw 18 the plate 19 may be adjusted circumferentially so that the stop $19^2$ may be brought to any position desired.

20 indicates a lever extension which is a separate piece from the lever 17 and is provided at its inner end with an orifice and at its outer end with an arc-shaped portion 22, which is concentric with the center of the stem 11 and which fits into the recessed or cut-out portion $14^x$ of the disk 14. 23 indicates a securing screw provided with a washer. The screw 23 extends through the slot 16× into the lever extension 20. By loosening this screw the lever extension may be swung to any desired position limited by the length of the slot 16×.

23× indicates a stationary stop which depends from the tie bar 13. By adjusting the stop 19² as above described the maximum extent to which the valve is turned by the stem 11 is limited. Similarly by the adjustment of the lever extension 20 the minimum amount to which the valve is opened is limited, such stops co-acting with the stationary stop 23× to limit the turning movement of the stem 11 to which the disk 16 is secured.

Normally the parts are in the position shown in Figs. 1, 2 and 3, that is to say, with the arc-shaped end of the extension 20 fitting within the recess or cut-out portion 14× of the disk 14. When in this position it would be impossible to operate the lever 15 to turn on the gas. As soon, however, as the lever 17 is swung to turn on the water and carry the arc-shaped portion of the lever extension 20 out of the recess 14× the disk 14 is released, freeing the lever 15 so that the lever may be swung to the desired position to operate the stem 12 and open the gas supply valve.

From this description it will be seen that I have devised a very simple device whereby the gas and water flow are controlled so that it would be impossible to turn on the gas supply without first turning on the water supply and at the same time in which means are provided whereby the maximum and minimum rate of water flow is controlled so that the water passing into the heater is heated to a greater or less extent, that is to say, if the water flow is increased the temperature to which it is raised will be less, whereas, if the water flow is decreased the temperature to which it is raised is correspondingly increased.

What I claim as my invention is:

1. The combination with gas and water supply pipes, of controlling valves one connected to each pipe provided with stems, and means carried by the stem of the gas supply valve and stem of the water supply valve for independently adjusting each stem to alter the proportion of gas and water and controlling the operation to prevent the operating of the gas supply valve stem while the water supply valve stem is in the closed position.

2. The combination with gas and water supply pipes, of controlling valves connected to the pipes provided with controlling stems, means for holding the stems spaced at a definite position apart, a member carried by the stem of the gas supply valve having an arc-shaped recess concentric with the stem of the water supply valve, a water supply valve lever, and an extension on such water supply valve lever fitting normally within the recess of the member carried by the gas supply valve stem.

3. The combination with a gas supply pipe and a water supply pipe and controlling valves co-acting therewith, of a stationary stop carried by the device, a member carried by the water supply valve stem, an operating lever connected thereto, and adjustable stops extending from such member and adapted to engage alternately with the opposite sides of the stationary stop and means co-acting with one of the adjustable stops for preventing opening of the gas supply valve while the water supply valve is closed.

4. The combination with a gas supply pipe and a water supply pipe and controlling valves co-acting therewith, of a stationary stop carried by the device, a disk carried by the water supply stem, an operating lever connected to the disk, a plate swung concentrically with the disk and having a portion projecting beyond the periphery thereof, means for securing the plate in the position to which it is adjusted, a lever extension also swung concentrically with the center of the disk, and means for securing the lever extension to any position to which it is adjusted.

5. The combination with a gas supply pipe and a water supply pipe and controlling valves co-acting therewith, of a stationary stop carried by the device, a disk carried by the water supply controlling valve stem, an operating lever connected to the disk, a plate swung concentrically with the disk and having a portion projecting beyond the periphery thereof, means for securing the plate in the position to which it is adjusted, a lever extension also swung concentrically with the center of the disk, means for securing the lever extension in any position to which it is adjusted, means for tying the valve stems and gas supply pipe and water supply pipe at a definite position apart, a disk carried by the stem of the gas supply valve having a recessed portion concentric with the center of the stem of the water supply valve, and an arc-shaped end to the aforesaid lever extension adapted to fit when in its normal position into the arc-shaped recess.

FREDERICK WILLIAM MAGEE.

Witnesses:
W. G. R. BARTRAM,
GRACE B. SMITH.